US011782895B2

(12) United States Patent
Levy et al.

(10) Patent No.: US 11,782,895 B2
(45) Date of Patent: Oct. 10, 2023

(54) CUCKOO HASHING INCLUDING ACCESSING HASH TABLES USING AFFINITY TABLE

(71) Applicant: MELLANOX TECHNOLOGIES TLV LTD., Raanana (IL)

(72) Inventors: Aviad Levy, Ge'alya (IL); Gil Levy, Hod Hasharon (IL); Pedro Reviriego, Madrid (ES); Salvatore Pontarelli, Rome (IT)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 18 days.

(21) Appl. No.: 17/013,697

(22) Filed: Sep. 7, 2020

(65) Prior Publication Data
US 2022/0075766 A1    Mar. 10, 2022

(51) Int. Cl.
*G06F 16/22*    (2019.01)
*G06F 1/12*    (2006.01)

(52) U.S. Cl.
CPC ............ *G06F 16/2255* (2019.01); *G06F 1/12* (2013.01)

(58) Field of Classification Search
None
See application file for complete search history.

(56) References Cited

U.S. PATENT DOCUMENTS

| | | |
|---|---|---|
| 5,537,514 A | 7/1996 | Nishidai |
| 6,611,875 B1 | 8/2003 | Chopra et al. |
| 6,957,215 B2 | 10/2005 | Stark |
| 7,051,078 B1 | 5/2006 | Cheriton |
| 7,054,315 B2 | 5/2006 | Liao |
| 7,061,874 B2 | 6/2006 | Merugu et al. |
| 7,116,663 B2 | 10/2006 | Liao |
| 7,234,019 B1 | 6/2007 | Kao et al. |
| 7,366,830 B1 | 4/2008 | Maheshwari |
| 7,394,809 B2 | 7/2008 | Kumar et al. |

(Continued)

OTHER PUBLICATIONS

Breslow et al., "Horton Tables: Fast Hash Tables for In-Memory Data-Intensive Computing", Proceedings of the 2016 USENIX Conference, Jun. 2016, pp. 281-294 (Year: 2016).*

(Continued)

*Primary Examiner* — Polina G Peach
*Assistant Examiner* — Anugeetha Kunjithapatham
(74) *Attorney, Agent, or Firm* — KLIGLER & ASSOCIATES PATENT ATTORNEYS LTD (57) ABSTRACT

A hashing apparatus includes a memory and circuitry. The memory stores (i) multiple hash tables storing associative entries, each including at least one entry key and a respective value, the hash tables are associated with respective different hash functions, and an associative entry is accessible by applying the relevant hash function to a key matching an entry key in the associative entry, and (ii) an affinity table that stores table-selectors for selecting hash tables with which to start a key lookup. The circuitry receives a key, reads from the affinity table, by applying an affinity function to the key, a table-selector that selects a hash table, accesses in the selected hash table an associative entry by applying the hash function associated with the selected hash table to the key, and in response to detecting that the key matches an entry key in the associative entry, outputs the respective value.

27 Claims, 6 Drawing Sheets

(56) References Cited

U.S. PATENT DOCUMENTS

| | | | |
|---|---|---|---|
| 7,426,518 | B2 | 9/2008 | Venkatachary et al. |
| 7,804,699 | B2 | 9/2010 | Gupta et al. |
| 7,904,642 | B1 | 3/2011 | Gupta et al. |
| 7,933,282 | B1 | 4/2011 | Gupta et al. |
| 8,271,564 | B2 | 9/2012 | Dade et al. |
| 8,290,934 | B2 | 10/2012 | Stergiou et al. |
| 8,305,271 | B2 | 11/2012 | Li et al. |
| 8,462,786 | B2 | 6/2013 | Liu et al. |
| 8,468,296 | B1 | 6/2013 | Cohen |
| 8,619,766 | B2 | 12/2013 | Wang et al. |
| 8,856,203 | B1 | 10/2014 | Schelp et al. |
| 8,861,347 | B2 | 10/2014 | Bloch et al. |
| 8,874,842 | B1 * | 10/2014 | Kimmel ............... G06F 3/0665 |
| | | | 711/100 |
| 8,938,469 | B1 | 1/2015 | Keen et al. |
| 9,087,586 | B2 | 7/2015 | Bosshart |
| 9,098,601 | B2 | 8/2015 | Wang |
| 9,111,615 | B1 | 8/2015 | Jiang |
| 9,171,030 | B1 | 10/2015 | Arad et al. |
| 9,223,711 | B2 | 12/2015 | Philip et al. |
| 9,245,626 | B2 | 1/2016 | Fingerhut et al. |
| 9,262,312 | B1 | 2/2016 | Gazit et al. |
| 9,270,592 | B1 | 2/2016 | Sites |
| 9,317,517 | B2 | 4/2016 | Attaluri et al. |
| 9,344,366 | B2 | 5/2016 | Bouchard et al. |
| 9,406,381 | B2 | 8/2016 | Akerib et al. |
| 9,411,908 | B2 | 8/2016 | Valency et al. |
| 9,424,366 | B1 | 8/2016 | Gazit et al. |
| 9,438,505 | B1 | 9/2016 | Zhou et al. |
| 9,461,931 | B1 | 10/2016 | Asveren |
| 9,543,015 | B1 | 1/2017 | Roy |
| 9,569,561 | B2 | 2/2017 | Wildman et al. |
| 9,627,063 | B2 | 4/2017 | Dharmapurikar |
| 9,659,046 | B2 | 5/2017 | Sen et al. |
| 9,672,239 | B1 | 6/2017 | Rottenstreich et al. |
| 9,704,574 | B1 | 7/2017 | Shamis |
| 9,779,123 | B2 | 10/2017 | Sen et al. |
| 9,785,666 | B2 | 10/2017 | Li et al. |
| 9,866,479 | B2 | 1/2018 | Wang et al. |
| 9,892,057 | B2 | 2/2018 | Levy et al. |
| 9,984,144 | B2 | 5/2018 | Levy et al. |
| 10,049,126 | B2 | 8/2018 | Levy et al. |
| 10,068,034 | B2 | 9/2018 | Levy et al. |
| 10,097,378 | B2 | 10/2018 | Dong et al. |
| 10,313,231 | B1 | 6/2019 | Bosshart |
| 11,108,728 | B1 | 8/2021 | Boutros et al. |
| 11,588,821 | B1 | 2/2023 | Detwiler et al. |
| 2002/0023080 | A1 | 2/2002 | Uga et al. |
| 2002/0089937 | A1 | 7/2002 | Venkatachary et al. |
| 2002/0154636 | A1 | 10/2002 | Thomas |
| 2003/0051165 | A1 | 3/2003 | Krishnan et al. |
| 2003/0123459 | A1 | 7/2003 | Liao |
| 2004/0100950 | A1 | 5/2004 | Basu et al. |
| 2005/0147113 | A1 * | 7/2005 | Brown .................... H04L 45/00 |
| | | | 370/428 |
| 2006/0209725 | A1 | 9/2006 | Cadambi et al. |
| 2006/0271539 | A1 * | 11/2006 | Loeb ................ G06F 16/2255 |
| 2008/0192754 | A1 | 8/2008 | Ku et al. |
| 2008/0215518 | A1 | 9/2008 | Matsuda |
| 2008/0228691 | A1 | 9/2008 | Shavit et al. |
| 2008/0259667 | A1 | 10/2008 | Wickeraad |
| 2009/0097654 | A1 * | 4/2009 | Blake ................ G06F 16/9014 |
| | | | 380/277 |
| 2010/0036820 | A1 * | 2/2010 | Stergiou .................. H04L 45/00 |
| | | | 711/206 |
| 2010/0080223 | A1 | 4/2010 | Wong et al. |
| 2010/0269024 | A1 | 10/2010 | Hao et al. |
| 2012/0054467 | A1 | 3/2012 | Fulton et al. |
| 2012/0137060 | A1 | 5/2012 | Akerib et al. |
| 2012/0275466 | A1 | 11/2012 | Bhadra et al. |
| 2013/0311492 | A1 | 11/2013 | Calvignac et al. |
| 2014/0006706 | A1 | 1/2014 | Wang |
| 2014/0089498 | A1 | 3/2014 | Goldfarb et al. |
| 2014/0201307 | A1 | 7/2014 | Banavalikar et al. |
| 2014/0215144 | A1 | 7/2014 | Valency et al. |
| 2014/0310307 | A1 | 10/2014 | Levy et al. |
| 2015/0052309 | A1 * | 2/2015 | Philip ................... G06F 12/082 |
| | | | 711/128 |
| 2015/0058595 | A1 | 2/2015 | Gura et al. |
| 2015/0117450 | A1 | 4/2015 | Thibaut |
| 2015/0127900 | A1 | 5/2015 | Dharmapurikar et al. |
| 2015/0207735 | A1 | 7/2015 | Kuramoto |
| 2015/0242429 | A1 | 8/2015 | Varvello et al. |
| 2015/0244842 | A1 | 8/2015 | Laufer et al. |
| 2016/0202932 | A1 | 7/2016 | Kadu |
| 2016/0294625 | A1 | 10/2016 | Mahkonen et al. |
| 2016/0350358 | A1 * | 12/2016 | Patel .................. G06F 16/1748 |
| 2017/0046395 | A1 | 2/2017 | Li et al. |
| 2017/0053012 | A1 | 2/2017 | Levy et al. |
| 2017/0147254 | A1 | 5/2017 | Adams et al. |
| 2017/0195253 | A1 | 7/2017 | Annaluru et al. |
| 2017/0286292 | A1 * | 10/2017 | Levy ....................... G06F 12/04 |
| 2017/0346765 | A1 | 11/2017 | Immidi |
| 2018/0011852 | A1 * | 1/2018 | Bennett ............... G06F 16/2228 |
| 2018/0262599 | A1 | 9/2018 | Firestone |
| 2018/0278525 | A1 | 9/2018 | Levy et al. |
| 2018/0330412 | A1 | 11/2018 | Fredriksson et al. |
| 2019/0036821 | A1 | 1/2019 | Levy et al. |
| 2019/0042304 | A1 | 2/2019 | Wang et al. |
| 2019/0149516 | A1 | 5/2019 | Rajahalme et al. |
| 2019/0340028 | A1 | 11/2019 | Fujiwara |
| 2020/0042629 | A1 | 2/2020 | Levy et al. |
| 2020/0089816 | A1 | 3/2020 | Shattah |
| 2020/0228449 | A1 | 7/2020 | Shmilovici |

OTHER PUBLICATIONS

U.S. Appl. No. 16/132,549 Office Action dated Oct. 28, 2020.
U.S. Appl. No. 16/559,658 Office Action dated Nov. 25, 2020.
U.S. Appl. No. 16/865,560 Office Action dated Oct. 14, 2021.
U.S. Appl. No. 16/865,560 Advisory Action dated Dec. 7, 2021.
U.S. Appl. No. 16/052,646 Office Action dated Mar. 19, 2021.
Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.
Pagh, R., "Cuckoo Hashing for Undergraduates", IT University of Copenhagen, pp. 1-6, Mar. 27, 2006.
Pagh et al., "Cuckoo Hashing", Journal of Algorithms, vol. 51, pp. 122-144, May 2004.
Kirsch et al., "Less Hashing, Same Performance: Building a Better Bloom Filter", Random Structures and Algorithms, vol. 33, issue 2, pp. 187-218, Sep. 2008.
Kirsch et al., "More Robust Hashing: Cuckoo Hashing with a Stash", SIAM Journal on Computing, vol. 39, Issue 4, pp. 1543-1561, Sep. 2009.
Patrow, A., "General Purpose Hash Function Algorithms", pp. 1-6, year 2000 http://www.partow.net/programming/hashfunctions/.
Laurence et al., "Spam Based Architecture for tcam for Low Area and Less Power Consumption", ARPN Journal of Engineering and Applied Sciences, vol. 10, No. 17, pp. 7607-7612, Sep. 2015.
Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.
Waldvogel et al., "Scalable High-Speed Prefix Matching", ACM Transactions on Computer Systems (TOCS), vol. 19, Issue 4, pp. 440-482, Nov. 2001.
Vamanan et al., "EffiCuts: optimizing packet classification for memory and throughput", Proceedings of the SIGCOMM conference, New Delhi, India, pp. 207-218, Aug. 30-Sep. 3, 2010.
Singh et al., "Packet classification using multidimensional cutting", Proceedings of SIGCOMM Conference, Karlsrube, German, pp. 213-224, Aug. 25-29, 2003.
Taylor et al., "ClassBench: a packet classification benchmark", WUCSE-2004-28, Applied Research Laboratory Department of Computer Science and Engineering, Washington University, Saint Louis, USA, pp. 1-37, May 21, 2004.
Demetriades et al., "An Efficient Hardware-basedMulti-hash Scheme for High Speed IP Lookup", 16th IEEE Symposium on High (56) References Cited

OTHER PUBLICATIONS

Performance Interconnects, pp. 103-110, Aug. 26-28, 2008.
Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.
Kasnavi et al., "A cache-based internet protocol address lookup architecture", Computer Networks, vol. 52 , pp. 303-326, year 2008.
Matousek, et al., "ClassBench-ng: Recasting ClassBench After a Decade of Network Evolution", Proceedings of the Symposium on Architectures for Networking and Communications Systems (ANCS '17), pp. 1-13, May 2017.
Remen et al., U.S. Appl. No. 16/559,658, filed Sep. 4, 2019.
Hua et al., "Variable-Stride Multi-Pattern Matching For Scalable Deep Packet Inspection", IEEE INFOCOM , pp. 415-423, Rio de Janeiro, Brazil, Apr. 19-25, 2009.
Che et al., "DRES: Dynamic Range Encoding Scheme for TCAM Coprocessors", IEEE Transactions on Computers, vol. 57, No. 7, pp. 902-915, Jul. 2008.
Liu et al., "TCAM Razor: A Systematic Approach Towards Minimizing Packet Classifiers in TCAMs", IEEE/ACM Transactions on Networking, vol. 18, No. 2, pp. 490-500, Apr. 2010.
Liu et al., "All-Match Based Complete Redundancy Removal for Packet Classifiers in TCAMs", Proceedings of IEEE 27th Conference on Computer Communications (INFOCOM 2008), pp. 574-582, Apr. 13-18, 2008.
Liu et al., "Complete Redundancy Removal for Packet Classifiers in TCAMs", IEEE Transactions on Parallel and Distributed Systems, vol. 21, No. 4, pp. 424-437, Apr. 2010.
Taylor et al., "Scalable Packet Classification using Distributed Crossproducting of Field Labels", IEEE INFOCOM, pp. 1-12, 2005.
Mittelman, U.S. Appl. No. 16/865,560, filed May 4, 2020.
Xu et al., "A Novel Hash-based Packet Classification Algorithm," 5th International Conference on Information Communications & Signal Processing, pp. 1504-1508, Dec. 2005.
Pontarelli et al., "Parallel d-Pipeline: A Cuckoo Hashing Implementation for Increased Throughput", IEEE Transactions on Computers, vol. 65, No. 1, pp. 326-331, Jan. 2016.
Reviriego et al., "Energy Efficient Exact Matching for Flow Identification with Cuckoo Affinity Hashing", IEEE Communications Letters, vol. 18, No. 5, pp. 885-888, May 2014.
Pontarelli et al., "Cuckoo Cache: A Technique to Improve Flow Monitoring Throughput", IEEE Internet Computing, vol. 20, issue 4, pp. 1-11, Jul.-Aug. 2016.
Zhou et al., "Scalable, High Performance Ethernet Forwarding with CUCKOOSWITCH", CoNEXT '13, pp. 1-12, Santa Barbara, USA, Dec. 9-12, 2013.
Bi et al., "Hierarchical trie packet classification algorithm based on expectation-maximization clustering," research article, Plos One, pp. 1-12, Jul. 13, 2017, as downloaded from https://journals.plos.org/plosone/article?d=10.1371/journal.pone.0181049.
Baboescu et al., "Scalable Packet Classification," IEEE/ACM Transactions on Networking, vol. 13, No. 1, pp. 2-14, Feb. 2005.
Kogan et al., "Strategies for Mitigating TCAM Space Bottlenecks," IEEE 22nd Annual Symposium on High-Performance Interconnects, IEEE Computer Society, pp. 25-32, year 2014.
U.S. Appl. No. 16/865,560 Office Action dated Jun. 24, 2021.
U.S. Appl. No. 16/052,646 Office Action dated Sep. 17, 2021.
U.S. Appl. No. 16/865,560 Office Action dated Feb. 8, 2022.
U.S. Appl. No. 16/865,560 Office Action dated May 23, 2022.
U.S. Appl. No. 17/402,545 Office Action dated Sep. 16, 2022.
U.S. Appl. No. 17/402,545 Office Action dated Jan. 30, 2023.
U.S. Appl. No. 17/402,545 Advisory Action dated Apr. 18, 2023.
U.S. Appl. No. 17/402,545 Office Action dated May 25, 2023.
U.S. Appl. No. 17/678,074 Office Action dated Aug. 3, 2023.

\* cited by examiner

CUCKOO HASHING INCLUDING
ACCESSING HASH TABLES USING
AFFINITY TABLE

TECHNICAL FIELD

Embodiments described herein relate generally to electrical digital data processing, and particularly to methods and apparatus for data storage and access using hashing techniques.

BACKGROUND

Hash tables are widely used in computer applications, communications, and logic circuits to implement associative arrays, i.e., data structures that map keys to values. For example, hash tables are used in network switching elements, such as bridges and routers, to map keys that are derived from specified header fields of packets received by the switching element to instructions that are to be applied in forwarding the packets by the switching element. Many other applications of hash tables are known in the art.

Techniques for implementing hash tables are known in the art. For example, in a paper titled "Parallel d-Pipeline: A Cuckoo Hashing Implementation for Increased Throughput," IEEE transactions on computers, volume 65, number 1, January, 2016, the authors propose a Cuckoo hashing implementation named "parallel d-pipeline," designed to increase throughput. The scheme presented is targeted to implementations in which the tables are accessed in parallel.

In a letter entitled "Energy Efficient Exact Matching for Flow Identification with Cuckoo Affinity Hashing," published in IEEE Communications Letters, volume 18, number 5, May 2014, first the energy efficiency of exact matching using Cuckoo hashing is analyzed and then a technique is presented to improve the energy efficiency of Cuckoo hashing. The proposed scheme is evaluated using a traffic monitoring application and compared with the traditional Cuckoo hashing.

U.S. Pat. No. 10,049,126, describes a decision apparatus that includes a first memory bank, containing a first table of hash composition factors, and a second memory bank, containing second and third tables of associative entries. A logic pipeline receives a sequence of data items and extracts a search key from each data item. A pre-hash circuit computes a first index by applying a first hash function to the search key. A first lookup circuit reads a hash composition factor from a location in the first memory bank indicated by the first index, and a hash circuit computes second and third indices as different combinations, determined by the hash composition factor, of second and third hash functions applied by the hash circuit to the search key. A second lookup circuit reads the entries in the second and third tables that are indicated respectively by the second and third indices.

SUMMARY

An embodiment that is described herein provides a hashing apparatus that includes a memory and circuitry. The memory is configured to store (i) multiple hash tables, configured to store associative entries each including at least one respective entry key and a respective value, the hash tables are associated with respective different hash functions, and an associative entry in a given hash table is accessible by applying the hash function corresponding to the given hash table to a key matching the entry key of the associative entry, and (ii) an affinity table, configured to store multiple table-selectors for selecting respective hash tables with which to start a key lookup. The circuitry is configured to receive a key to be searched, to read from the affinity table, by applying an affinity function to the key, a table-selector that selects a hash table from among the multiple hash tables, to access in the selected hash table an associative entry by applying the hash function associated with the selected hash table to the key, and in response to detecting that the key matches an entry key in the associative entry, to output the respective value.

In some embodiments, the affinity function comprises a dedicated hash function. In other embodiments, the circuitry is configured to, in response to detecting that the key fails to match the entry key, attempt matching the key to another entry key in another hash table by applying to the key the hash function corresponding to the another hash table. In yet other embodiments, the circuitry is configured to, in response to detecting that the key matches an entry key in a given hash table, store the table-selector of the given hash table in the affinity table. In further yet other embodiments, the circuitry is configured to, in response to detecting that a given key matches an entry key in a given associative entry stored in a first hash table but the corresponding table-selector in the affinity table selects a second different hash table, move one or more associative entries among the hash tables so as to improve key search performance.

In an embodiment, the circuitry is configured to, in response to detecting that a location corresponding to the given key in the second hash table is available, move the given associative entry to the location in the second hash table. In another embodiment, the circuitry is configured to, in response to detecting that a location corresponding to the given key in the second hash table is unavailable, move an associative entry from the location to a third hash table, and to move the given associative entry to the location in the second hash table. In yet another embodiment, the circuitry is configured to move the given associative entry from the first hash table to a third hash table so that starting a key lookup with the third hash table is faster than with the first hash table.

In some embodiments, the circuitry includes multiple lookup engines assigned respectively the multiple hash tables, and the circuitry is configured to receive multiple keys, to retrieve from the affinity table multiple respective table-selectors in parallel, and based on the retrieved table-selectors, to distribute one or more of the received keys to respective one or more lookup engines, for parallel key lookup. In other embodiments, the circuitry is configured to forward a key that fails matching in a given hash table using a respective lookup engine for lookup by another lookup engine. In yet another embodiment, the circuitry comprises a clock source, and each of the lookup engines is configured to search, in each clock cycle of the clock source, one of (i) a key not yet searched by any of the lookup engines, or (ii) a key that has failed matching in another lookup engine.

In an embodiment, the associative entry includes multiple entry keys and respective values, and the circuitry is configured to check whether the key matches one of the multiple entry keys, and in response to detecting that the key matches an entry key, to output the value corresponding to the matching entry key.

There is additionally provided, in accordance with an embodiment that is described herein, a method, including, in an apparatus including a memory that stores (i) multiple hash tables storing associative entries each including at least one respective entry key and a respective value, the hash tables are associated with respective different hash functions, and an associative entry in a given hash table is accessible by applying the hash function corresponding to the given hash table to a key matching an entry key in the associative entry, and (ii) an affinity table storing multiple table-selectors for selecting respective hash tables with which to start a key lookup, the method including receiving a key to be searched. A table-selector that selects a hash table from among the multiple hash tables is read from the affinity table, by applying an affinity function to the key. An associative entry is accessed in the selected hash table by applying the hash function associated with the selected hash table to the key. In response to detecting that the key matches an entry key in the associative entry, the respective value is outputted.

There is additionally provided, in accordance with an embodiment that is described herein, a computer software product, the product including a non-transitory computer-readable storage medium in which computer program instructions are stored, which instructions, when executed by a processor, cause the processor to access in a memory multiple hash tables storing associative entries each including at least one respective entry key and a respective value, the hash tables are associated with respective different hash functions, and an associative entry in a given hash table is accessible by applying the hash function corresponding to the given hash table to a key matching the entry key of the associative entry, to access in the memory an affinity table storing multiple table-selectors for selecting respective hash tables with which to start a key lookup, to receive a key to be searched, to read from the affinity table, by applying an affinity function to the key, a table-selector that selects a hash table from among the multiple hash tables, to access in the selected hash table an associative entry by applying the hash function associated with the selected hash table to the key, and in response to detecting that the key matches an entry key in the associative entry, to output the respective value.

These and other embodiments will be more fully understood from the following detailed description of the embodiments thereof, taken together with the drawings in which:

DETAILED DESCRIPTION OF EMBODIMENTS

Overview

Embodiments that are described herein provide improved methods and circuits for high-performance Cuckoo hashing using an affinity table.

Hash tables are widely used in computer applications, communications, and logic circuits to implement associative arrays, i.e., data structures that map keys to values. For example, hash tables are used in network switching elements, such as bridges and routers, to map keys that are derived from specified header fields of packets received by the switching element to instructions that are to be applied in forwarding the packets by the switching element. Many other applications of hash tables are known in the art.

A hash table uses a hash function to compute, for each key, an index to a "slot" in an array where the desired value is held. Such hash functions are chosen so as to provide a uniform distribution of hash results, and thus minimize the number of collisions between different keys, i.e., occurrences in which the hash function maps two (or more) keys to the same slot.

One useful approach to avoidance of collisions is "cuckoo hashing," described by Pagh and Rodler in an article entitled "Cuckoo Hashing," Journal of Algorithms 51 (2004), pages 122-144. As described by the authors, cuckoo hashing uses two hash tables, T1 and T2, each accessed by a different, respective hash function, h1 or h2. When inserting a new element with key x into the tables, both h1(x) and h2(x) are computed, and if one of the corresponding slots is vacant, the value for x is inserted there. (Either slot may be chosen if both are vacant.) When both slots are occupied, however, the current occupant of one of the slots, for example, an existing element with key y, such that h1(y)=h1(x), is ejected from its slot and moved to the slot with index h2(y). If this latter slot is also occupied (for example, by an element with key z such that h2(z)=h2(y)), this process of ejection and replacement, referred to herein as "Cuckoo moving," will continue until a vacant slot is found or until a predefined timeout period has expired. In the latter case, the tables may be recomputed using new hash functions.

An important performance measure in key-value databases is the lookup time or the number of lookup operations per second. For example, by improving Cuckoo hashing lookup performance in high-end switches, the switch throughput and packet-per-second processing capability are also improved.

Optimally, a single access to a hash table would be required per each key. In naïve Cuckoo hashing schemes, however, multiple (e.g., four) hash tables are accessed simultaneously for searching a single key. In the disclosed embodiments, an affinity table is used to select a hash table that with high probability stores the key being searched, and therefore should be accessed first. This approach improves the lookup performance significantly, because for most keys a match is found in the first hash table accessed.

In some embodiments, a hashing apparatus comprises a memory and circuitry. The memory is configured to store multiple Cuckoo hash tables and an affinity table. The Cuckoo hash tables are also referred to simply as "hash tables" for brevity. The hash tables store associative entries each comprising at least one respective entry key and a respective value, wherein the hash tables are associated with respective different hash functions, and an associative entry in a given hash table is accessible by applying the hash function corresponding to the given hash table to a key matching an entry key in the associative entry. The affinity table stores multiple table-selectors (e.g., indices or pointers) for selecting respective hash tables with which to start a key lookup. The table-selectors are accessible by applying an affinity function to respective keys. The circuitry is configured to receive a key to be searched, to read from the affinity table, by applying the affinity function to the key, a table-selector that selects a hash table from among the multiple hash tables, to access in the selected hash table an associative entry by applying the hash function associated with the selected hash table to the key. In response to detecting that the key matches an entry key in the associative entry, the circuitry outputs the respective value. In some embodiments, the affinity function comprises a dedicated hash function.

For best performance, each key should be stored in a hash table selected by the affinity table to be the first to be search. Since, however, the size of the affinity table is limited, two or more keys may be mapped by the affinity table to the same hash table. In such cases, a key may be stored in a hash table different from the one selected by the affinity table. In an embodiment, the hash tables are scanned in some predefined order, e.g., in a sequential cyclic order. It is thus advantageous to store a key in a hash table closer in the scanning order to the hash table selected by the affinity table.

In an affinity-table based scheme, a key lookup is mainly performed in two steps. First, the affinity table is read and the retrieved value (e.g., two bits in case of four hash tables) is used to select the first hash table to access. Then, the hash tables are searched, e.g., sequentially and cyclically, starting from the hash table selected by the affinity table.

In some embodiments, in response to detecting that the key fails to match the key entry, the circuitry attempts to match the key to another key entry in another hash table by applying to the key the hash function corresponding to the another hash table. When the key matches an entry key in a given hash table, the circuitry may store the table-selector of the given hash table in the affinity table. When storing the table selector in the affinity table, that key will be found in the first hash table selected by the affinity table.

In some embodiments, in response to detecting that a given key matches an entry key in a given associative entry stored in a first hash table but the corresponding table-selector in the affinity table selects a second different hash table, the circuitry moves one or more associative entries among the hash tables so as to improve key search performance. In an embodiment, in response to detecting that a location corresponding to the given key in the second hash table is available, the circuitry moves the given associative entry to the location in the second hash table. Otherwise, the location in the second hash table is unavailable, and the circuitry moves an associative entry from the location to a third hash table and moves the given associative entry to the location in the second hash table. In some embodiments, the circuitry moves the given associative entry from the first hash table to a third hash table so that starting a key lookup with the third hash table is faster than with the first hash table.

In some embodiments, the apparatus supports searching multiple keys in parallel. In such embodiments, the circuitry comprises multiple lookup engines assigned respectively to the multiple hash tables. The circuitry receives multiple keys and retrieves from the affinity table multiple respective table-selectors in parallel. Based on the retrieved table-selectors, the circuitry distributes one or more of the received keys to respective one or more lookup engines, for parallel key lookup. When a key fails matching in a given hash table using a respective lookup engine, the circuitry forwards the key for lookup by another lookup engine. In an embodiment, the circuitry operates in synchronization with a clock source, and each of the lookup engines searches, in each clock cycle of the clock source, one of (i) a key not yet searched by any of the lookup engines, or (ii) a key that has failed matching in another lookup engine.

In some embodiments, the associative entry comprises multiple entry keys and respective values, and the circuitry is configured to check whether the key matches one of the multiple entry keys. In response to detecting that the key matches an entry key, the circuitry outputs the value corresponding to the matching entry key.

In the disclosed techniques an affinity table is used for selecting hash tables to be searched first, thus reducing the average number of hash tables searched per key lookup. The affinity table consumes only small storage space compared to the hash tables. When a key is found in a hash table, the affinity table is updated to select that hash table. As a result, frequently used keys (e.g., associated with high volume flows) tend to have optimal table-selectors in the affinity table. The performance achieved using the disclosed embodiments is close to optimal.

System Description

Figure 1:
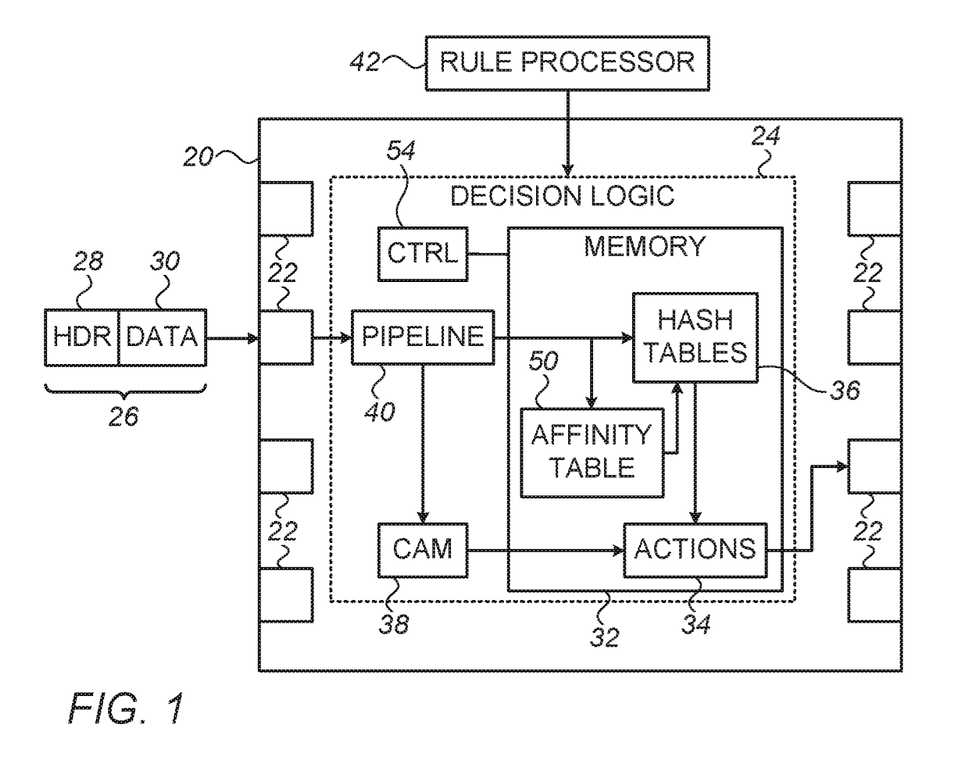
FIG. 1 is a block diagram that schematically illustrates a network element, in accordance with an embodiment that is described herein.

FIG. 1 is a block diagram that schematically illustrates a network element 20, in accordance with an embodiment that is described herein.

In the disclosed embodiments, network element 20 operates as packet decision and forwarding apparatus. Network element 20 can be configured as a network switch, bridge or router, for example, with multiple ports 22 connected to a packet communication network. Network element 20 comprises decision logic 24 that forwards data packets 26 between ports 22, and may also perform other actions, such as, for example, encapsulation and de-capsulation, security filtering, and/or quality-of-service functions. The detailed circuitry involved in carrying out such forwarding and other functions is omitted from the figures for the sake of simplicity.

In the embodiment of FIG. 1, decision logic 24 receives packets 26, each containing a header 28 and payload data 30. Decision logic 24 comprises a processing pipeline 40 that extracts a search key from each packet 26, typically (although not necessarily) including the contents of certain fields of header 28. For example, the key may comprise the source and destination addresses and ports and a protocol identifier. Pipeline 40 matches the key against hash tables 36 containing a set of associative entries, which are stored in a memory 32, such as, for example, a Static Random Access Memory (SRAM) in network element 20, as described in detail hereinbelow. Memory 32 also contains a list of actions 34 to be performed when a key is found to match one of the hash tables entries. For this purpose, each associative entry in hash tables 36 typically contains a pointer (e.g., the value of the corresponding key-value) to the particular action that decision logic 24 is to apply to packets 26 in case of a match. Hash tables 36 may be used, inter alia, in applying packet classification rules. In some embodiments, each associative entry in hash tables 36 comprises multiple key-value pairs.

In some embodiments, decision logic 24 further comprises a Content-Addressable Memory (CAM) 38, which contains associative entries that have not been incorporated into hash tables 36 in memory 32. CAM 38, sometimes referred to herein as a "stash" or "spillover stash", may contain, for example, associative entries that have recently been added to network element 20 and not yet incorporated into the data structure of hash tables 36. Additionally or alternatively, CAM 38 may contain entries that were ejected from their slots in hash tables 36 and for which a new slot was not found within a predefined timeout period.

Similarly to the associative entries of the hash tables, the entries in CAM 38 also point to corresponding actions 34 in memory 32. Pipeline 40 may match the classification keys of all incoming packets 26 against both hash tables 36 in memory 32 and CAM 38. Alternatively, CAM 38 may be addressed only if a given classification key does not match any of the associative entries in hash tables 36.

Memory 32 further stores an affinity table 50. As will be described in detail below, the affinity table stores indices to the hash tables, indicating for each key which of the hash tables is the first to be searched. By properly managing the content of the affinity table, the lookup time reduces significantly.

Decision logic further comprises a controller 54 that manages hash tables 36 and affinity table 50. Efficient Cuckoo hashing schemes implemented by a controller such as controller 54, will be described in detail below.

In the example shown in FIG. 1, a rule processor 42 is responsible for inserting associate elements received by network element 20 into hash tables 36. A method for inserting elements into hash tables will be described further below.

A Cuckoo Hashing Scheme that Includes an Affinity Table

Figure 2:
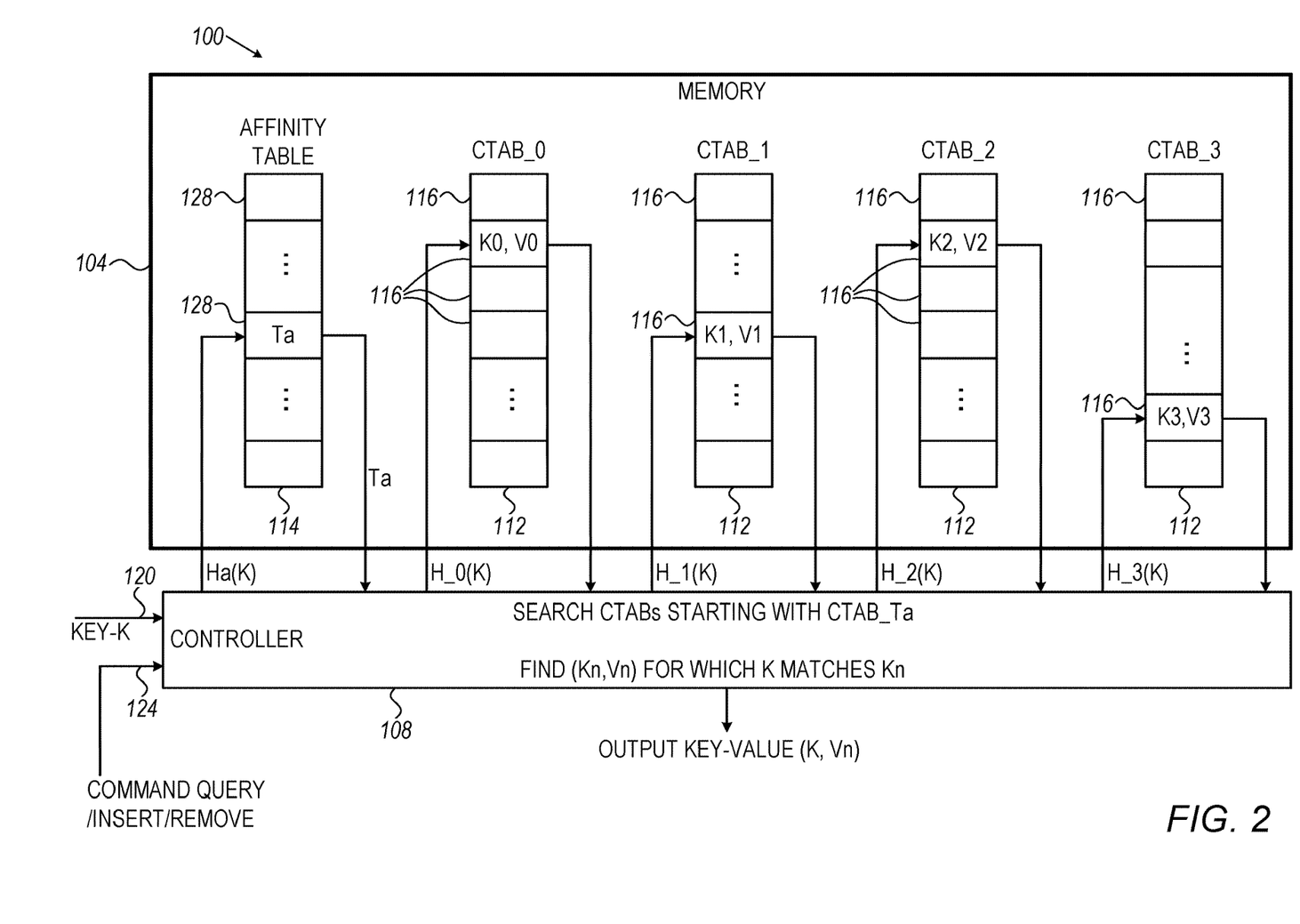
FIG. 2 is a block diagram that schematically illustrates a Cuckoo hashing scheme that includes an affinity table, in accordance with an embodiment that is described herein.

FIG. 2 is a block diagram that schematically illustrates a Cuckoo hashing scheme 100 that includes an affinity table, in accordance with an embodiment that is described herein.

The Cuckoo hashing scheme of FIG. 2 can be used, for example in managing the hash tables and affinity table of the network element of FIG. 1.

Cuckoo hashing scheme 100 comprises a memory 104 and a controller 108. In the example of FIG. 2, memory 104 stores four Cuckoo hash tables 112, denoted CTAB_0 . . . CTAB_3, and an affinity table 114. Each of Cuckoo hash tables 112 comprises multiple associative entries 116, each of which may store a key and an associated value. In some embodiments, each associative entry 116 may store one or more key-value pairs. Controller 108 may be used for implementing controller 54 of FIG. 1, and memory 104 may be used for implementing memory 32 of FIG. 1.

Controller 108 handles various operations applied on the Cuckoo hash tables, e.g., in response to commands received, for example from rule processor 42 of FIG. 1.

In some embodiments the controller receives an input key 120 denoted 'K' and a command 124. The same command may be applied to multiple keys. Key 120 may be provided, for example, by pipeline 40 of FIG. 1. The command, possibly containing a key, may be provided by rule processor 42 of FIG. 1. In the present example, the Cuckoo hashing scheme supports at least the commands: query—for looking up the key K in the Cuckoo hash tables, insert—for inserting a new key and associated value into one of the Cuckoo hash tables, and remove—for removing a key and associated value from the Cuckoo hash tables.

In FIG. 2, Cuckoo hash tables 112 are associated with four different respective hash functions, denoted H_0 . . . H_3. Various hash functions may be used for implementing H_0 . . . H_3, including, for example, the MurmurHash or the xxHash hash function. Alternatively, a suitable Cyclic Redundancy Check (CRC) can also be as a hash function.

Given a key K, controller 108 calculates four K indices H_0(K) . . . H_3(K), using the respective Cuckoo hash functions. As depicted in FIG. 2, the Cuckoo hash tables are typically accessed at different locations for the same key K. In the example of FIG. 2, the controller reads from the Cuckoo hash tables keys K0 . . . K3 and compares the read keys to the input key K to find a match. When the K matches one of the read keys K0 . . . K3, the controller reads from the relevant table the value associated with the matching key, and outputs the matching key and associated value. In this case, controller 108 skips visiting the remaining Cuckoo hash tables. Otherwise, K does not match any of K0 . . . K3, and the controller outputs an indication that the key K was not found.

In some embodiments, memory 104 supports accessing only a single Cuckoo hash table at a time. In such embodiments, controller 108 accesses the Cuckoo hash tables serially, starting e.g., with CTAB_0. As a result, the controller performs, on average, about 2.5 hash table accesses for each input key (assuming that the Cuckoo hash tables are close to full occupancy). This is much less efficient than an optimal search that would require accessing a single hash table per key lookup.

In some embodiments, memory 104 supports accessing multiple Cuckoo hash tables in parallel. For example, memory 104 comprises four separate memory devices, each storing a respective one of the four Cuckoo hash tables. In such embodiments, the controller may access the four Cuckoo hash tables using four different keys in parallel.

In some embodiments, to increase the lookup performance, controller 108 stores in memory 104 an affinity table 114, accessible by the controller independently from the Cuckoo hash tables. In an embodiment, affinity entries 128 of the affinity table comprise table-selectors (e.g., indices or pointers) to the Cuckoo hash tables. For example, to access four Cuckoo hash tables 112, each affinity entry 128 may comprise an integer index in the range 0 . . . 3. The storage space consumed by the affinity is therefore typically very small compared to the Cuckoo hash tables. For example, assuming a total number M of associative entries in the four Cuckoo hash tables, each associative entry comprises 128 bits, and an affinity table having 2M affinity entries of 2 bits, the storage ratio of the affinity table relative to the Cuckoo hash tables is given by 2M·2 bits/(M·128 bits), which is about 3%. Note that in general the number of affinity entries in the affinity table is independent from the number of associative entries in the Cuckoo hash tables.

To lookup a key K in the Cuckoo hash tables, controller 108 first calculates an affinity table location Lc=Ha(K), wherein Ha(•) is a hash function dedicated to the affinity table. Ha may comprise one of the hash functions mentioned above used for accessing the Cuckoo hash tables. As will be described below, the controller manages the affinity table 128 so that the affinity entry Ta at location Lc=Ha(K) points, with high probability, to the Cuckoo hash table containing the key K. As a result, the average number of Cuckoo hash tables visited per key reduces significantly, and the look-up throughput increases.

Methods for Managing Cuckoo Hash Tables and Affinity Table

Figure 3:
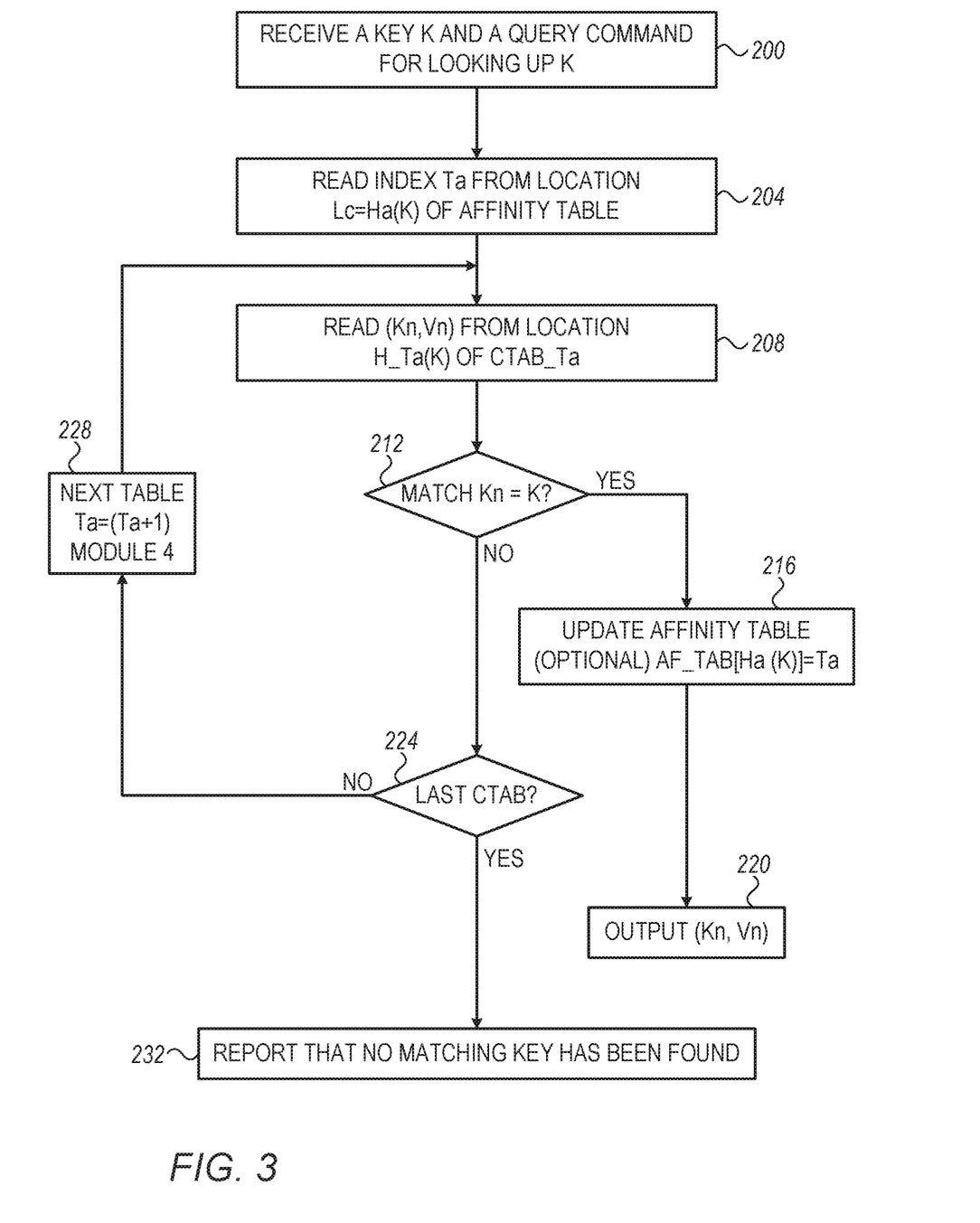
FIG. 3 is a flow chart that schematically illustrates a method for a key query in a Cuckoo hashing scheme that includes an affinity table, in accordance with an embodiment that is described herein.

FIG. 3 is a flow chart that schematically illustrates a method for a key query in a Cuckoo hashing scheme that includes an affinity table, in accordance with an embodiment that is described herein.

The method will be described as executed by controller 108 of Cuckoo hashing scheme 100 of FIG. 2. In describing the method, it is assumed that the affinity table stores indices in the range 0 . . . 3 for selecting among four Cuckoo hash tables.

The method begins with controller 108 receiving a key 120 (denoted K) and a query command 124 for searching K in Cuckoo hash tables 112, at a query command reception step 200. At an affinity table accessing step 204, the controller calculates Lc=Ha(K), and reads an index Ta from location Lc of affinity table 128.

At a Cuckoo hash table accessing step 208, depending on Ta, the controller applies the hash function H_Ta to the key K to produce a location H_Ta(K). The controller reads a key Kn and associated value Vn from location H_Ta(K) of table CTAB_Ta.

At a comparison step 212, the controller checks whether Kn matches (e.g., equals) K, and if so, the controller proceeds to an affinity table updating step 216. At step 216, the controller (optionally) updates the affinity entry at location Lc=Ha(K) of the affinity table (denoted AF_TAB) to the value Ta corresponding to the Cuckoo hash table containing the matching key. As a result of updating location Lc in the affinity table, a subsequent key equals K will be found in the first Cuckoo hash table searched. Note that updating the affinity table at step 216 is not mandatory, but typically improves lookup performance.

At an outputting step 220, the controller outputs the key-value pair (Kn,Vn). Following step 220 the method terminates. In the description that follows, a "key-value pair" is also referred to simply as a "key-value" for brevity.

When at step 212 K does not match Kn, controller 108 proceeds to a loop management step 224, to check whether K has been searched in all of the Cuckoo hash tables. If there is at least one Cuckoo hash table in which K was not yet searched, the controller advances to a subsequent Cuckoo hash table by calculating Ta=(Ta+1)modulo 4, at a next table selection step 228, and loops back to step 208 to search K in subsequent Cuckoo hash tables. When at step 212 and 224 the key K failed to match Kn in all Cuckoo hash tables, the controller outputs a notification indicative of the failure to find a matching key, at a no-match reporting step 232, and the method terminates.

As noted above, updating the affinity table at step 216 is optional. In some embodiments, the controller always updates the affinity table during lookup at step 216. This approach may be useful, for example, when the affinity table resides in an internal SRAM. In other embodiments, the controller may update the affinity table occasionally. In an example embodiment, the controller may update the affinity table when detecting that such updating is likely to improve the lookup performance. As another example, when the lookup performance can be sacrificed, the controller may update the affinity table occasionally for reducing the memory bandwidth of the memory (e.g., a DRAM) storing the affinity table.

In the method of FIG. 3, when step 216 is omitted, the lookup performance, may degrade over time due to Cuckoo movements caused by subsequent key-value insertions. In some embodiments, to prevent such performance degradation, the controller cyclically scans the Cuckoo hash tables to update the affinity entries in the affinity table. A method of this sort will be described with reference to FIG. 6 below.

When performing step 216, the controller stores the index of the Cuckoo hash table that contains the key in the affinity table. This causes selection by affinity table affinity of Cuckoo hash tables storing keys that are searched frequently, which in turn increases the lookup performance. The affinity table thus stores affinity values for recently searched keys.

Another advantage of updating the affinity table during lookup includes decoupling the management of the affinity table from the process of key-value insertion into the Cuckoo hash tables. Moreover, updating the affinity table during lookup, efficiently retains the affinity table well aligned to the Cuckoo hash tables.

Figures 4, 5:
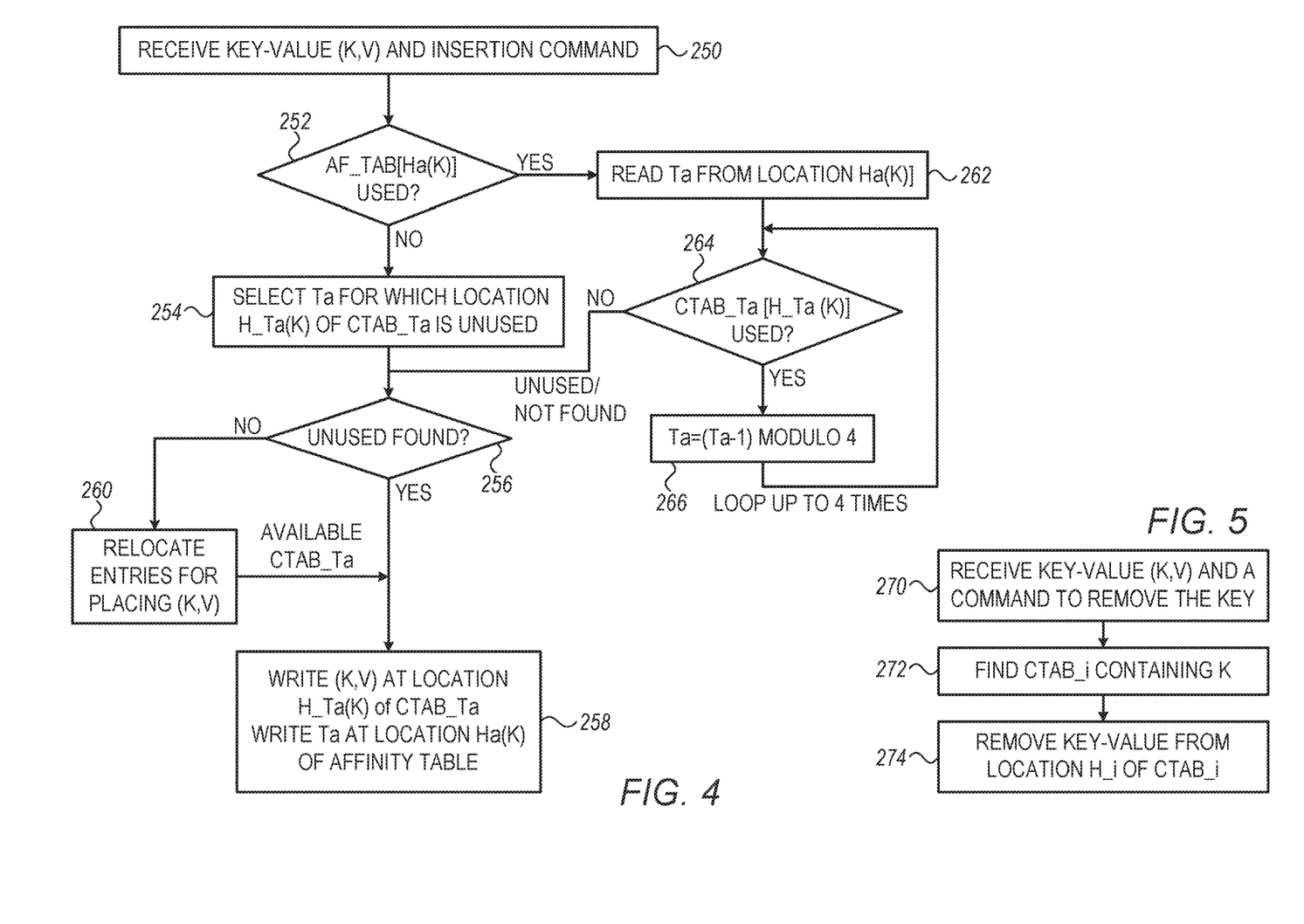
FIG. 4 is a flow chart that schematically illustrates a method for key-value insertion into Cuckoo hash tables, in accordance with an embodiment that is described herein.
FIG. 5 is a flow chart that schematically illustrates a method for key-value removal from Cuckoo hash tables, in accordance with an embodiment that is described herein.

FIG. 4 is a flow chart that schematically illustrates a method for key-value insertion into Cuckoo hash tables, in accordance with an embodiment that is described herein.

The method will be described as executed by controller 108 of Cuckoo hashing scheme 100 of FIG. 2.

The method begins with controller 108 receiving a key-value and a command for inserting the key-value to the Cuckoo hash tables, at an insertion command reception step 250. At an affinity table query step 252, the controller calculates a location Lc=Ha(K) and checks whether location Lc in the affinity table (denoted AF_TAB) is used. When the affinity entry at location Lc is currently unused, the controller proceeds to a Cuckoo hash table selection step 254. At step 254, the controller attempts to find a Cuckoo hash table for storing the key-value received at step 250. To this end, the controller attempts to select an integer Ta in the range 0 . . . 3, so that location H_Ta (K) of Cuckoo hash table CTAB_Ta is unused. For example, the controller may check this condition for Ta=0 . . . 3 and stop when the condition is met.

At an unused query step 256, the controller checks whether a Cuckoo hash table with an unused associative entry was found for storing the key-value, and if so, proceeds to an insertion step 258. At step 258, the controller writes the key-value at location H_Ta(K) of CTAB_Ta, and further writes Ta at location Ha(K) of the affinity table.

When at step 256 no Cuckoo hash table is found, the controller proceeds to a Cuckoo moving step 260, at which the controller attempts to relocate one or more associative entries in the Cuckoo hash tables so as to make room for storing the key-value in CTAB_Ta. Assuming that after performing step 260, CTAB_Ta become available for storing the key-value, the controller proceeds to step 258 to store the key-value in CTAB_Ta and to store Ta in the affinity table described above.

When at step 252 above the affinity entry at location Lc=Ha(K) is used, the controller reads the current table index Ta from location Lc=Ha(K) of the affinity table, at an affinity reading step 262. At a Cuckoo hash table query step 264, the controller checks whether the associative entry at location H_Ta(K) of CTAB_Ta is unused, and if so, the controller attempts a subsequent Cuckoo hash table by modifying Ta to (Ta−1)modulo 4, and looping back to step 264. The controller loops over steps 264 and 266 until a Cuckoo hash table with an available associative entry is found or when all the Cuckoo hash tables have been checked, and proceeds to step 256 described above.

FIG. 5 is a flow chart that schematically illustrates a method for key-value removal from Cuckoo hash tables, in accordance with an embodiment that is described herein.

The method will be described as executed by controller 108 of Cuckoo hashing scheme 100 of FIG. 2.

The method begins with controller 108 receiving a key-value and a command to remove that key-value from the Cuckoo hash tables at a removal command reception step 270. At a hash table selection step 272, the controller finds a Cuckoo hash table containing K. For example, the controller checks whether the received key matches a key stored at location H_i(K) of CTAB_i, for i=0, 1, 2 and 3. When such a Cuckoo hash table is found, the controller removes the key-value from location H_i(K) of that Cuckoo hash table, at a removal step 274. Following step 274 the method terminates.

Affinity Table and Cuckoo Hash Table Optimization

As noted, above, for best performance, the affinity table (e.g., 114 in FIG. 2) should select the Cuckoo hash table containing the key being searched. In practice, however, the number of affinity entries in the affinity table is typically smaller than the total number of keys to be searched. As a result, applying the dedicated hash function Ha to two different keys K1 and K2 may result in a common hash result, i.e., K1≠K2 but Ha(K1)=Ha(K2). This means that both K1 and K2 should be stored in the same Cuckoo hash table (e.g., CTAB_i), which is possible when H_i(K1) differs from H_i(K2). In general, however, it is typically impossible to place all the keys colliding on the affinity table in the same Cuckoo hash table. In such cases, the controller may store K1 in the Cuckoo hash table selected by Ha(K1) and store K2 in another Cuckoo hash table. Consequently, K2 will fail to find a matching key in the Cuckoo hash table selected by Ha(K2), and will need to be searched in one or more other Cuckoo hash tables.

Let the term "affinity count" associated with a key K, define the number of the Cuckoo hash tables required to be searched to find the key K. In general, lower affinity count corresponds to a faster key lookup. The affinity count of K is denoted A(K). Assuming four Cuckoo hash tables, A(K) gets integer values in the range 1 . . . 4. Let the affinity count assigned to multiple keys K1 . . . Kn be given by A(K1 . . . Kn)=A(K1)+ . . . +A(Kn). The best key lookup performance is achieved when A(K1 . . . Kn) is minimal over all possible ways in which K1 . . . Kn can be stored in the four Cuckoo hash tables, assuming that all keys are equally likely to be searched.

When for a given key, the affinity table selects the Cuckoo hash table that contains K, the corresponding affinity count is A(K)=1. When the affinity table selects CTAB_i for K, but K is stored in CTAB_j j≠i, the corresponding affinity count can be calculated as follows. Let 'd' be given by d=|i−j|. Then, for j>i A(K)=1+d, and for j<i A(K)=4−d. In this case, the minimal affinity count is A(K)=2, achieved when K2 is stored in the next Cuckoo hash table indexed by [Ha(K1)+1]modulo 4.

When the next Cuckoo hash table is occupied for K2, the controller may move the occupying associative entry (e.g., storing K3) to another Cuckoo hash table to make room for K2. In an embodiment, the controller applies this K3 moving, only if the overall affinity count for K1, K2 and K3−A(K1,K2,K3) decreases compared to keeping K3 in place and storing K2 in another Cuckoo hash table.

Next described is a method for moving keys among the Cuckoo hash tables and updating the affinity table accordingly, for reducing the average affinity count of the stored keys.

Figure 6:
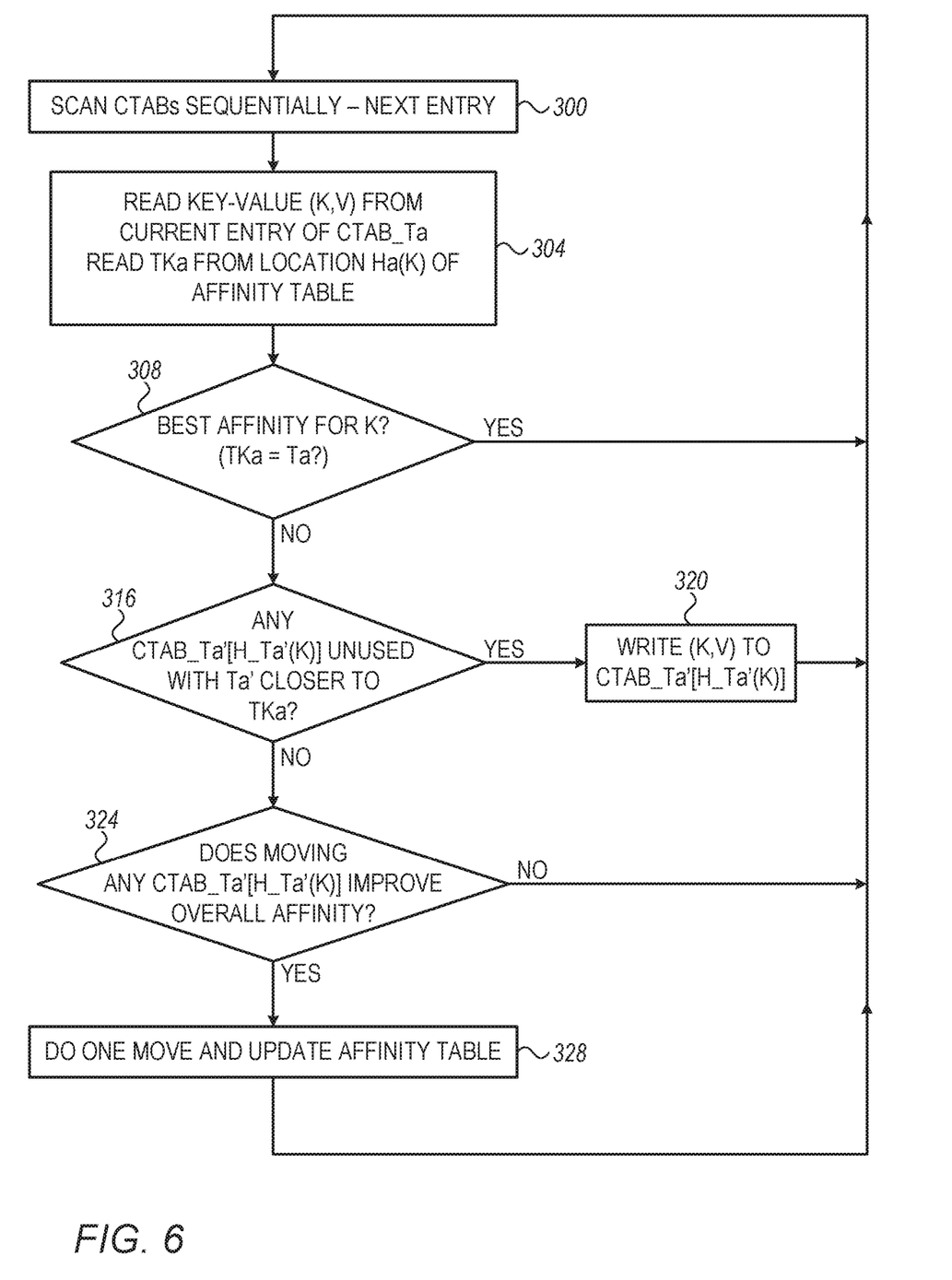
FIG. 6 is a flow chart that schematically illustrates a method for optimizing affinity table and Cuckoo hash tables, in accordance with an embodiment that is described herein.

FIG. 6 is a flow chart that schematically illustrates a method for optimizing affinity table and Cuckoo hash tables, in accordance with an embodiment that is described herein.

The method will be described as executed by controller 108 of Cuckoo hashing scheme 100 of FIG. 2.

The method begins with controller 108 scanning the associative entries of Cuckoo hash tables, at a scanning step 300. In some embodiments, the controller scans all the associative entries of a given Cuckoo hash table before proceeding to scan the associative entries of another Cuckoo hash table. Alternatively, other suitable scanning orders can also be used.

At a reading step 304, the controller reads a key-value (K,V) from the current associative entry of some Cuckoo hash table CTAB_Ta, wherein Ta is an integer between 0 and 3. Further at step 304, the controller reads from location Ha(K) of affinity table 114, an index denoted TKa.

At an affinity checking step 308, the controller checks whether the current TKa=Ta (i.e., TKa selects CTAB_Ta containing K), and if so, loops back to step 300 for proceeding to the next associative entry.

Otherwise, at step 308, TKa≠Ta, and the controller proceeds to a table selection step 316. At step 316, the controller attempts to find an index Ta' closer to TKa than Ta, and for which the associative entry of CTAB_Ta' at location H_Ta' (K) is available. When multiple Ta' values meet the condition, the controller selects a Ta' closest to TKa among these multiple TA' values. When the controller finds such an index Ta', the controller writes the key-value (K,V) of step 304 to location H_Ta'(K) of CTAB_Ta', at a key-value writing step 320, and proceeds to step 300 for processing the next associative entry. Note that a flow resulting in executing step 320 improves the overall affinity count, because Ta' is closer to TKa than Ta. In the present context, the term "closer" means that (Ta'−TKa)modulo 4 is smaller than (Ta−TKa) modulo 4.

When the result at step 316 is negative, the controller proceeds to a movement checking step 324. At step 324, controller 108 checks whether moving any associative entry from location H_Ta' (K) of CTAB_Ta' (Ta'=0 . . . 3), and storing (K,V) instead of the moved associative entry, improves the overall affinity count, and if not, loops back to step 300. Otherwise, at a moving step 328, the controller moves an associative entry from a CTAB_Ta' resulting in maximal reduction of the affinity count, and writes (K,V) in CTAB_Ta'. The controller updates both affinity entries corresponding to the inserted key and moved key in the affinity table. The controller then loops back to step 300 to process a next associative entry.

At step 328 above, the controller may perform an associative entry move from one Cuckoo hash table to another in various ways.

A Hardware Implementation of a Parallel Cuckoo Hashing Scheme

Figure 7:
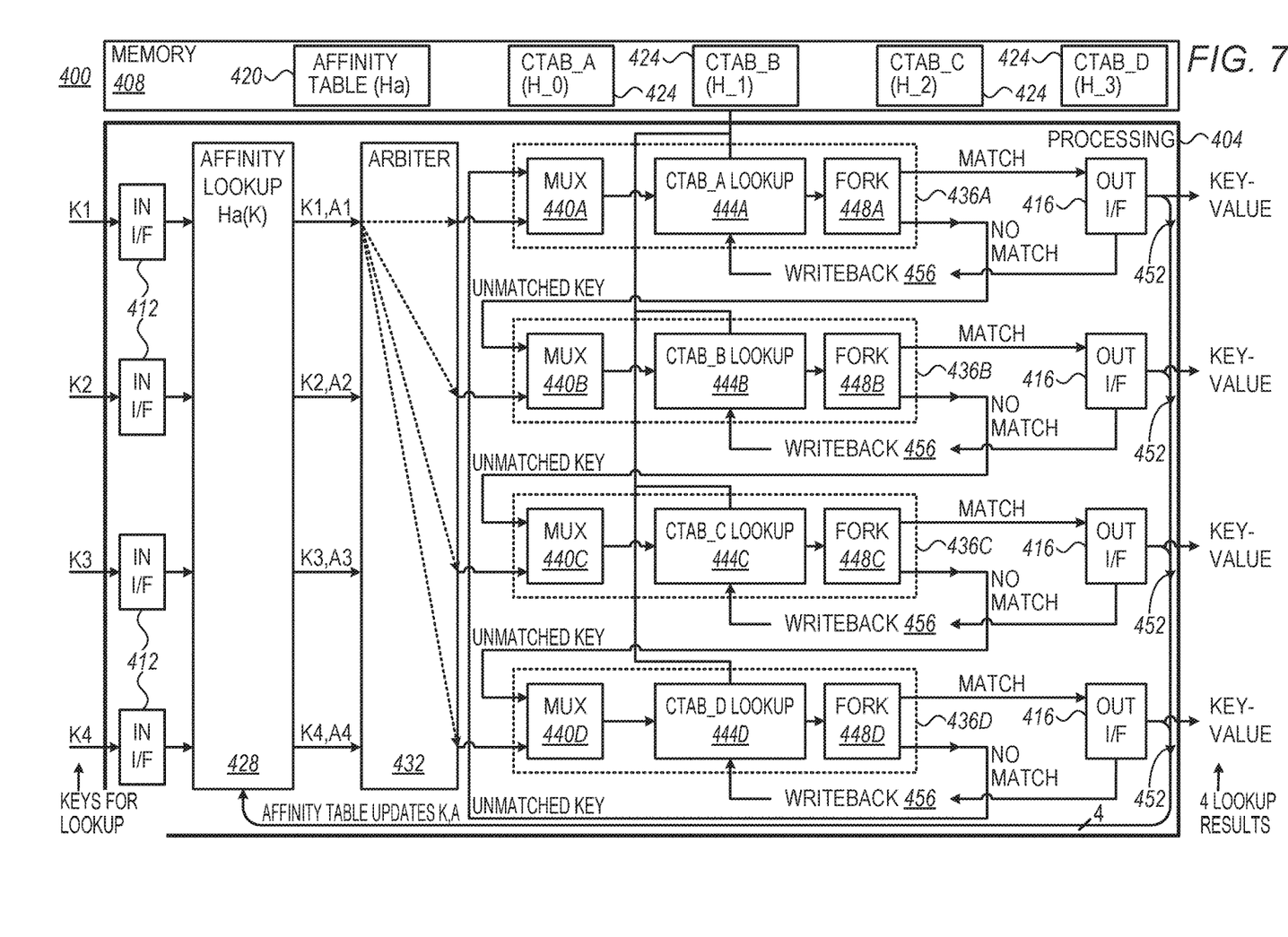
FIG. 7 is a block diagram that schematically illustrates a hardware circuit implementing a parallel Cuckoo hashing scheme that includes an affinity table, in accordance with an embodiment that is described herein.

FIG. 7 is a block diagram that schematically illustrates a hardware circuit 400 implementing a parallel Cuckoo hashing scheme that includes an affinity table, in accordance with an embodiment that is described herein.

Circuit 400 comprises a processing circuit 404, a memory 408, N input interfaces 412 for receiving up to N keys in parallel, and N output interfaces 416 for outputting up to N key-values in parallel. In the present example N=4, and the input keys are denoted K1 . . . K4. In alternative embodiments, however, any integer N>1 other than 4 can also be used.

Circuit 400 comprises a clock source (not shown) and operates in synchronization with the clock source, so that the circuit receives up to N=4 keys, performs N key lookup operations and outputs up to N key-value results in a single clock cycle.

Memory 408 comprises an affinity table 420 associated with a dedicated hash function Ha, and four Cuckoo hash tables 424 denoted CATB_A . . . CTAB_D associated with respective hash functions H_0 . . . H_3. The Cuckoo hash tables store key-value pairs to be looked up. A given key may be stored in only one of the N Cuckoo hash tables. Affinity table 420 stores affinity values, each of which comprises an index (or a pointer) selecting a respective Cuckoo hash table 424 to be searched first. In some embodiments, the affinity table and the Cuckoo hash tables are each accessible individually.

Processing circuit 404 comprises an affinity lookup module 428, an arbiter 432, and N=4 processing chains 436A . . . 436D. Processing circuit 404 receives via input interfaces 412 (up to) N=4 keys (e.g., K1 . . . K4) in parallel. Affinity lookup module 428 reads from affinity table 420 affinity values A1 . . . A4 associated respectively with K1 . . . K4, by applying hash function Ha to each of the keys K1 . . . K4. In some embodiments, the affinity lookup module calculates Ha (K1) . . . Ha (K4) in parallel and retrieves the four affinity values A1 . . . A4 from the affinity table in parallel. In such embodiments, the affinity table supports a parallel multi-entry reading mode.

Arbiter 432 receives from affinity lookup module 428 keys K1 . . . K4 and corresponding affinity values A1 . . . A4, and distributes (key, affinity value) pairs to processing chains 436A . . . 436D. The arbiter provides the (key, affinity value) pairs to processing chains that are available for processing them, as will be described below.

Processing chains 436A . . . 436D respectively comprise multiplexers 440A . . . 440D, Cuckoo hash table lookup modules 444A . . . 444D, and forks 448A . . . 448D. Processing chains 436A . . . 436D are associated with respective Cuckoo hash tables CTAB_A . . . CTAB_D.

When processing chain 436A receives a key (e.g., K) via multiplexer 440A, CTAB_A lookup module 444A applies to K the hash function H_0, retrieves from location H_0 (K) of CTAB_A a key-value pair (K0,V0) (not shown0, and checks whether K0 matches K. When K=K0, lookup module 444A passes K0 and V0 to fork 448A for output via output interface 416 coupled to fork 448A. Otherwise, fork 448A passes the unmatched key K to multiplexer 440B of processing chain 436B.

The other processing chains operate in a similar manner. For example, when unmatched K belongs to CTAB_B, processing chain 436B outputs K and a corresponding value read from CTAB_B, via fork 448B, and otherwise further forwards K to processing chain 436C, and so on. When a key looked up in CTAB_D fails in processing chain 436D, fork 448D passes that key to multiplexer 440A of processing chain 436A. The processing chains thus cyclically pass unmatched keys to subsequent processing chains.

Using the four processing chains, four keys are looked up in parallel within a single clock cycle. A key that was found by a given processing chain is output via an output interface, and the given processing chain receives from arbiter 432 another key to be searched in the next clock cycle. When a key is found in CTAB_i, the relevant fork passes the index i to the output interface. In some embodiments, the output interfaces pass the indices i (452) of matched keys back to affinity lookup module 428 for updating corresponding affinity values in the affinity table.

When a key provided to a given processing chain is not found in the corresponding Cuckoo hash table, the given processing chain passes the key to multiplexer 440 of the subsequent processing chain. Consequently, in the next clock cycle, that subsequent processing chain will look up the unmatched key instead of receiving via the multiplexer another key from arbiter 432. Each input key is thus input to one of the processing chains that is available and may be searched in a number of Cuckoo hash tables between one and four.

In some embodiments, CTAB lookup modules 444A . . . 444D manage information that is updated based on the matched keys outputted. In such embodiments, each output interface writes back suitable information 456 to the CTAB lookup module of the same chain processing module. This feature can be used, for example, for tracking the number of times Cuckoo hash table having a matched key.

The embodiments described above, were mainly described for Cuckoo hash tables that store a single key-value per associative entry. This, however, is not mandatory. In some embodiments, the associative entries may each comprise one or more entry keys and respective values. In such embodiments, the controller (e.g., 108 of FIG. 2) checks whether the key to be searched matches one of the entry keys stored in a relevant associative entry. In response to detecting that the key matches an entry key, the controller outputs the value corresponding to the matching entry key. Assume, for example, that the key-value pairs (K1,V1) and (K2,V2) are stored at the same location (associative entry) of the Cuckoo hash table (e.g., a configuration of two slots per bucket). In a lookup operation, a key K is compared, with K1 and/or K2 (e.g., K1 and K2 in parallel) to check for a match between K and one of K1 and K2.

Performance Evaluation

The inventors have conducted computer simulations to evaluate the performance of the parallel Cuckoo hashing scheme of FIG. 7. In the simulations, common traffic distributions were tested, in which the traffic comprises a small number of high-volume ("elephant") flows and many low-volume ("mice") flows carrying little traffic. The simulation results below refer to a configuration in which the number of affinity entries is twice as large as the overall number of associative entries in the four Cuckoo hash tables.

Table 1 depicts the average number of hash table accesses per key lookup in using an affinity table without updating the affinity table during key lookup.

TABLE 1

| simulation results in using table updated upon key lookup an affinity | | | | | |
|---|---|---|---|---|---|
| Cuckoo hash tables occupancy | No Scrub | Scrub 1 No moving | Scrub 1 moving 1 | Scrub 10 No moving | Scrub 10 moving 1 |
| 50% | 1.20 | 1.04 | 1.03 | 1.04 | 1.01 |
| 75% | 1.33 | 1.17 | 1.12 | 1.16 | 1.10 |
| 90% | 1.34 | 1.30 | 1.25 | 1.29 | 1.24 |

In Table 1, "No Scrub" refers to refraining from applying the method of FIG. 6 (with and without step 328), whereas "Scrubbing 1" and "Scrubbing 10" refer to applying the method of FIG. 6 one time and ten times, respectively. Further in Table 1, "No moving" means skipping performing step 328 in the method of FIG. 6, whereas "Moving 1" means applying a single Cuckoo hashing move at step 328 in FIG. 6.

As seen in Table 1, for 90% occupancy, using scrubbing and allowing one move achieves an average number of hash table accesses that is 24% larger than the optimal number 1.0.

When updating the affinity table during lookup is allowed, however, the average number of accesses per key lookup reduced to 1.06, which is very close to the optimal number 1.0.

The configurations of network element 20 of FIG. 1, and of Cuckoo hashing schemes 100 and 400 of respective FIGS. 2 and 7 are example configurations, which are chosen purely for the sake of conceptual clarity. In alternative embodiments, any other suitable network element and Cuckoo hashing scheme configurations can also be used. The different elements of network element 20 and Cuckoo hashing schemes 100 and 400 may be implemented in hardware, such as using one or more Application-Specific Integrated Circuits (ASICs) or Field-Programmable Gate Arrays (FPGAs). In alternative embodiments, some elements of network element 20 and/or Cuckoo hashing schemes 100 and 400, e.g., decision logic 24, controller 54, controller 108 and/or CTAB_0 . . . CTAB_3 lookup modules 444A . . . 444D, may be implemented in software executing on a suitable processor, or using a combination of hardware and software elements.

Elements that are not necessary for understanding the principles of the present application, such as various interfaces, addressing circuits, timing and sequencing circuits and debugging circuits, have been omitted from FIGS. 1, 2 and 7 for clarity.

In some embodiments, decision logic 24, controller 54, controller 108 and/or CTAB_0 . . . CTAB_3 lookup modules 444A . . . 444D may comprise general-purpose processors, which are programmed in software to carry out the network element and/or Cuckoo hashing schemes described herein. The software may be downloaded to the processors in electronic form, over a network, for example, or it may, alternatively or additionally, be provided and/or stored on non-transitory tangible media, such as magnetic, optical, or electronic memory.

In the disclosed embodiments and in the claims, the term "circuitry" refers to elements of a Cuckoo hashing scheme excluding the memory that stores the Cuckoo hash tables and the affinity table. In FIG. 2, the circuitry comprises controller 108. In FIG. 7, the circuitry comprises the elements of processing circuit 404, including input interfaces 412, affinity lookup module 428, arbiter 432, lookup engines 436A . . . 436D and output interfaces 416.

Memory 32 of FIG. 1, memory 104 of FIG. 2 and memory 408 of FIG. 7 may comprise any suitable re-writable memory such as, for example, a Random Access Memory (RAM) or a Static RAM (SRAM) or multiple SRAM devices. In other embodiments, a Dynamic RAM (DRAM) can be used in sequential access, or multiple DRAM devices can be used for parallel access of the Cuckoo hash tables. In yet other embodiments, the affinity table is stored in a memory of one type (e.g., SRAM), whereas the Cuckoo hash tables are stored in a memory of different type (e.g., one or more DRAM devices).

The embodiments described above are given by way of example, and other suitable embodiments can also be used.

Although the embodiments described herein mainly address efficient Cuckoo hashing for packet processing/classification in a network element or a network adapter, the methods and systems described herein can also be used in other applications, such as in a general purpose key-value storage or database, implemented, e.g., in software. The affinity table may be stored in a cache, and the Cuckoo hash tables may be stored in one or more DRAMs. The disclosed embodiments may also be used in a distributed key-value storage.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A hashing apparatus, comprising a memory and circuitry,
    wherein the memory is to hold:
        multiple hash tables, comprising associative entries each comprising at least one respective entry key and a respective value, wherein the hash tables are associated with respective hash functions, wherein associative entries in a given hash table are accessible by applying the hash function corresponding to the given hash table to respective keys being searched; and
        an affinity table, comprising multiple table-selectors, each table selector selecting one of the hash tables with which a search for a searched key is to begin; and
    wherein the circuitry is to:
        receive a key to be searched;
        read from the affinity table, by applying an affinity function to the key, a table-selector that selects a first hash table from among the multiple hash tables;
        attempt matching the key to entry keys in the first hash table;
        in response to detecting that the key matches an entry key in the first hash table, output the value corresponding to the matching entry key; and
        in response to detecting that a given key matches an entry key in a second hash table, different from the first hash table that was selected by the affinity table, make a subsequent search for the given key faster, by updating the table-selector in the affinity table to select the second hash table instead of the first hash table.

2. The hashing apparatus according to claim 1, wherein the affinity function comprises a dedicated hash function.

3. The hashing apparatus according to claim 1, wherein the circuitry is to, in response to detecting that the key being searched fails to match the entry key, attempt matching the key to another entry key in another hash table by applying to the key the hash function corresponding to the another hash table.

4. The hashing apparatus according to claim 1, wherein the circuitry is to, in response to detecting that a certain key matches an entry key in a given associative entry stored in a third hash table, but the table-selector of the certain key in the affinity table points to a fourth different hash table, move one or more associative entries among the hash tables so as to improve key search performance.

5. The hashing apparatus according to claim 4, wherein, the circuitry is to, in response to detecting that a location corresponding to the certain key in the fourth hash table is available, move the given associative entry to the location in the fourth hash table.

6. The hashing apparatus according to claim 4, wherein the circuitry is to, in response to detecting that a location corresponding to the certain key in the fourth hash table is unavailable, move an associative entry from the location to another hash table, and move the given associative entry to the location in the fourth hash table.

7. The hashing apparatus according to claim 4, wherein the circuitry is to move the given associative entry from the third hash table to another hash table so that starting a key lookup with the another hash table is faster than with the third hash table.

8. The hashing apparatus according to claim 1, wherein the circuitry comprises multiple lookup engines assigned respectively the multiple hash tables, wherein the circuitry is to receive multiple keys, to retrieve from the affinity table multiple respective table-selectors in parallel, and based on the retrieved table-selectors, to distribute one or more of the received keys to respective one or more lookup engines, for parallel key lookup.

9. The hashing apparatus according to claim 8, wherein the circuitry is to forward a key that fails matching in a given hash table using a respective lookup engine for lookup by another lookup engine.

10. The hashing apparatus according to claim 8, wherein the circuitry is to operate in synchronization with a clock source, and wherein each of the lookup engines is to search, in each clock cycle of the clock source, (i) a key not yet searched by any of the lookup engines, or (ii) a key that has failed matching in another lookup engine.

11. The hashing apparatus according to claim 1, wherein the associative entry comprises multiple entry keys and respective values, and wherein the circuitry is to check whether the key matches any of the multiple entry keys, and in response to detecting that the key matches an entry key among the multiple entry keys in the associative entry, to output the value corresponding to the matching entry key.

12. A method, comprising:
in an apparatus comprising a memory that holds (i) multiple hash tables comprising associative entries each comprising at least one respective entry key and a respective value, wherein the hash tables are associated with respective hash functions, and wherein associative entries in a given hash table are accessible by applying the hash function corresponding to the given hash table to respective keys being searched; and
an affinity table comprising multiple table-selectors, each table selector selecting one of the hash tables with which a search for a searched key is to begin, the method comprising:
receiving a key to be searched;
reading from the affinity table, by applying an affinity function to the key, a table-selector that selects a first hash table from among the multiple hash tables;
attempting matching the key to entry keys in the first hash table;
in response to detecting that the key matches an entry key in the first hash table, outputting the value corresponding to the matching entry key; and
in response to detecting that a given key matches an entry key in a second hash table, different from the first hash table that was selected by the affinity table, making a subsequent search for the given key faster, by updating the table-selector in the affinity table to select the second hash table instead of the first hash table.

13. The method according to claim 12, wherein the affinity function comprises a dedicated hash function.

14. The method according to claim 12, and comprising, in response to detecting that the key being searched fails to match the entry key, attempting to match the key to another entry key in another hash table by applying to the key the hash function corresponding to the another hash table.

15. The method according to claim 12, and comprising, in response to detecting that a certain key matches an entry key in a given associative entry stored in a third hash table, but the table-selector of the certain key in the affinity table points to a fourth different hash table, moving one or more associative entries among the hash tables so as to improve key search performance.

16. The method according to claim 15, and comprising, in response to detecting that a location corresponding to the certain key in the fourth hash table is available, moving the given associative entry to the location in the fourth hash table.

17. The method according to claim 15, and comprising, in response to detecting that a location corresponding to the certain key in the fourth hash table is unavailable, moving an associative entry from the location to another hash table, and moving the given associative entry to the location in the fourth hash table.

18. The method according to claim 15, and comprising moving the given associative entry from the third hash table to another hash table so that starting a key lookup with the another hash table is faster than with the third hash table.

19. The method according to claim 12, wherein the apparatus comprises multiple lookup engines assigned respectively the multiple hash tables, and comprising receiving multiple keys, retrieving from the affinity table multiple respective table-selectors in parallel, and based on the retrieved table-selectors, distributing one or more of the received keys to respective one or more lookup engines, for parallel key lookup.

20. The method according to claim 19, and comprising forwarding a key that fails matching in a given hash table using a respective lookup engine for lookup by another lookup engine.

21. The method according to claim 19, and comprising operating the apparatus in synchronization with a clock source, and searching by each of the lookup engines, in each clock cycle of the clock source, (i) a key not yet searched by any of the lookup engines, or (ii) a key that has failed matching in another lookup engine.

22. The method according to claim 12, wherein the associative entry comprises multiple entry keys and respective values, and comprising checking whether the key matches any of the multiple entry keys, and in response to detecting that the key matches an entry key among the multiple entry keys in the associative entry, outputting the value corresponding to the matching entry key.

23. A computer software product, the product comprising a non-transitory computer-readable storage medium in which computer program instructions are stored, which instructions, when executed by a processor, cause the processor to:
access in a memory multiple hash tables comprising associative entries each comprising at least one respective entry key and a respective value, wherein the hash tables are associated with respective hash functions, wherein associative entries in a given hash table are accessible by applying the hash function corresponding to the given hash table to respective keys being searched;
access in the memory an affinity table comprising multiple table-selectors, each table selector selecting one of the hash tables with which a search for a searched key is to begin;
receive a key to be searched;

read from the affinity table, by applying an affinity function to the key, a table-selector that selects a first hash table from among the multiple hash tables;

attempt matching the key to entry keys in the first hash table;

in response to detecting that the key matches an entry key in the first hash table, output the value corresponding to the matching entry key; and in response to detecting that a given key matches an entry key in a second hash table, different from the first hash table that was selected by the affinity table, make a subsequent search for the given key faster, by updating the table-selector in the affinity table to select the second hash table instead of the first hash table.

24. The hashing apparatus according to claim 1, wherein at least some of the hash tables are associated with different respective hash functions.

25. The method according to claim 12, wherein at least some of the hash tables are associated with different respective hash functions.

26. The hashing apparatus according to claim 1, wherein, to make the subsequent search faster, the circuitry is to reduce an affinity count associated with the given key.

27. The method according to claim 12, wherein making the subsequent search faster comprises reducing an affinity count associated with the given key.

\* \* \* \* \*